(No Model.)
J. A. PRICE.
WATER HEATER FOR STOVES AND RANGES.
No. 312,017. Patented Feb. 10, 1885.
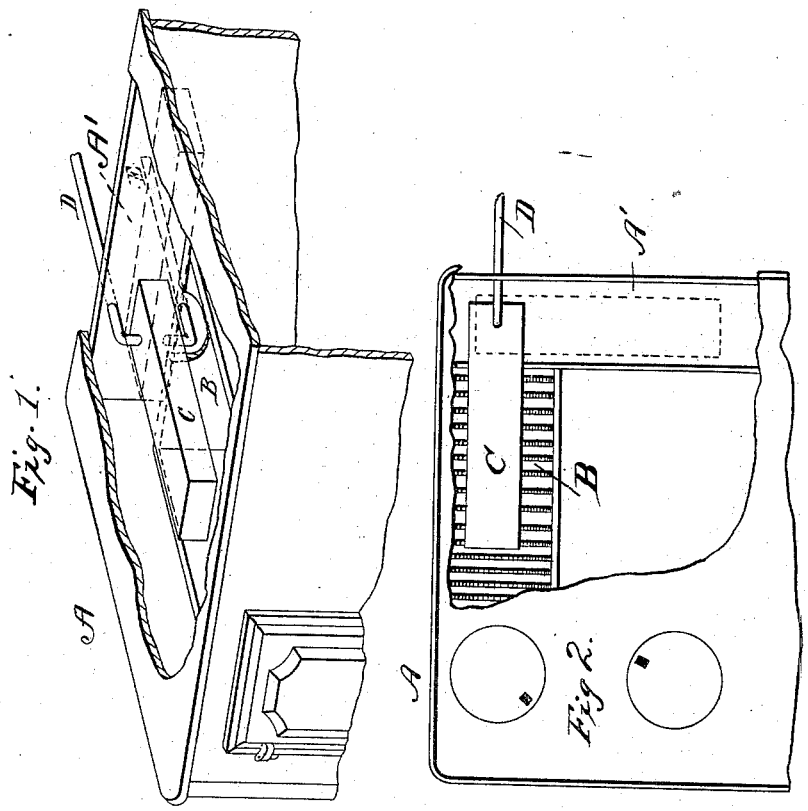
Witnesses:
W. C. Jirdiuston
Fred F. Church
Inventor:
John A. Price
by
C. Melville Church.
his Attorney

UNITED STATES PATENT OFFICE.

JOHN A. PRICE, OF SCRANTON, PENNSYLVANIA.

WATER-HEATER FOR STOVES AND RANGES.

SPECIFICATION forming part of Letters Patent No. 312,017, dated February 10, 1885.

Application filed December 3, 1883. (No model.)

*To all whom it may concern:*

Be it known that I, JOHN A. PRICE, of Scranton, in the county of Lackawanna, Pennsylvania, have invented certain new and useful Improvements in Water-Heaters for Stoves and Ranges; and I do hereby declare the following to be a full, clear, and exact description of the same, reference being had to the accompanying drawings, forming part of this specification, and to the figures and letters of reference marked thereon.

My invention has for its object to provide an improved water-heater for stoves and ranges, forming a permanent part thereof and located within the casing, and made adjustable so as to be turned into or out of the fire-chamber without disturbing the walls or fire-linings of said chamber, and provided with suitable inlet and outlet connections for the circulation of water to and from a suitable water supply or reservoir.

In the accompanying drawings, Figure 1 is a perspective view of a portion of a range to which my improved heater is applied; Fig. 2, a top plan view of the same.

The letter A represents the portion of the range referred to, containing the fire-chamber or fire-pot B. At one end or side of this fire-chamber, on the inside of the outer casing, A', I provide a water-heating chamber, C, of any desired form, and mount it, preferably at one end, upon centers or pivots in such manner that it may be turned horizontally out over the fire, so as to receive heat from the latter, or turned backward away from the fire and outside of the fire-chamber, so as not to be injuriously affected by the heat, even though it may be empty through failure of water-supply or from other causes. Connected to this water-chamber are two pipes, D, which respectively lead to and from a reservoir or water-supply, and serve, when the heater is adjusted over the fire, to form an inlet for the cooler water and the exit for the heated water. For convenience the extremities of these pipes are arranged to serve as the pivots or trunnions upon which the heater turns, the joints between the heater and pipes being preserved steam and water tight by the appliances usually employed for such purposes.

It will be noted that the water-chamber is so located within the casing of the stove or range as not to be in the way or prevent the top of the stove being utilized, while its adjustability permits it to be swung over or away from the fire, when desired, without disturbing the latter or the walls of the fire-pot.

It will be observed that when the water-heater is turned away from the fire it is disposed between the fire-pot and the outer casing of the stove, entirely out of the way, thus enabling a constant supply of hot water to be maintained while there is any water to be heated or so long as hot water is desired, or the heater to be withdrawn out of harm's way whenever for any reason the water-supply is cut off or fails.

I claim as my invention—

The combination, with a stove or range, of a water-heater located within the stove-casing, and hinged or pivoted so as to swing laterally over or away from the fire without disturbing the fire or the walls of the fire-pot, and having inlet and outlet connections for the passage of water to and from a water supply or reservoir, substantially as described.

JOHN A. PRICE.

Witnesses:
MELVILLE CHURCH,
A. STEUART.